(12) United States Patent
Sutherland et al.

(10) Patent No.: US 12,268,964 B2
(45) Date of Patent: Apr. 8, 2025

(54) WORLD PREDICTION WITHIN A GAME APPLICATION ENVIRONMENT

(71) Applicant: Electronic Arts Inc., Redwood City, CA (US)

(72) Inventors: Dustin Sutherland, Coquitlam (CA); Toru Tokuhara, New Westminster (CA)

(73) Assignee: Electronic Arts Inc., Redwood City, CA (US)

( * ) Notice: Subject to any disclaimer, the term of this patent is extended or adjusted under 35 U.S.C. 154(b) by 99 days.

(21) Appl. No.: 18/193,554

(22) Filed: Mar. 30, 2023

(65) Prior Publication Data

US 2024/0325916 A1    Oct. 3, 2024

(51) Int. Cl.
*A63F 13/577*     (2014.01)
*A63F 13/57*      (2014.01)

(52) U.S. Cl.
CPC ............ *A63F 13/577* (2014.09); *A63F 13/57* (2014.09); *A63F 2300/643* (2013.01)

(58) Field of Classification Search
CPC ...... A63F 13/577; A63F 13/57; A63F 13/573; A63F 2300/643; A63F 2300/64; A63F 2300/646

USPC .......................................................... 463/31
See application file for complete search history.

(56) References Cited

U.S. PATENT DOCUMENTS

| | | | | |
|---|---|---|---|---|
| 7,788,071 | B2* | 8/2010 | Bond | A63F 13/577 |
| | | | | 703/6 |
| 8,243,061 | B2* | 8/2012 | Matsumura | G06T 15/60 |
| | | | | 345/419 |
| 9,953,116 | B2* | 4/2018 | Ishikawa | G06F 30/20 |
| 10,679,511 | B2* | 6/2020 | Kikuchi | B64D 45/04 |
| 2020/0103971 | A1* | 4/2020 | Lee | G06F 3/014 |

* cited by examiner

*Primary Examiner* — Allen Chan
(74) *Attorney, Agent, or Firm* — Knobbe, Martens, Olson & Bear, LLP

(57) ABSTRACT

Embodiments of the present application provide systems and methods for world prediction within a game application environment. The systems and methods can include a world prediction module for predicting collisions between virtual objects in the game application environment. The world prediction module can use game state data to simulate the virtual objects into future instances. The world prediction module can parse the future instances to find collisions in a farfield representation of the virtual objects and collisions in a nearfield representation of the virtual objects. The world prediction module can use collision information to update a game engine of the game application.

20 Claims, 11 Drawing Sheets

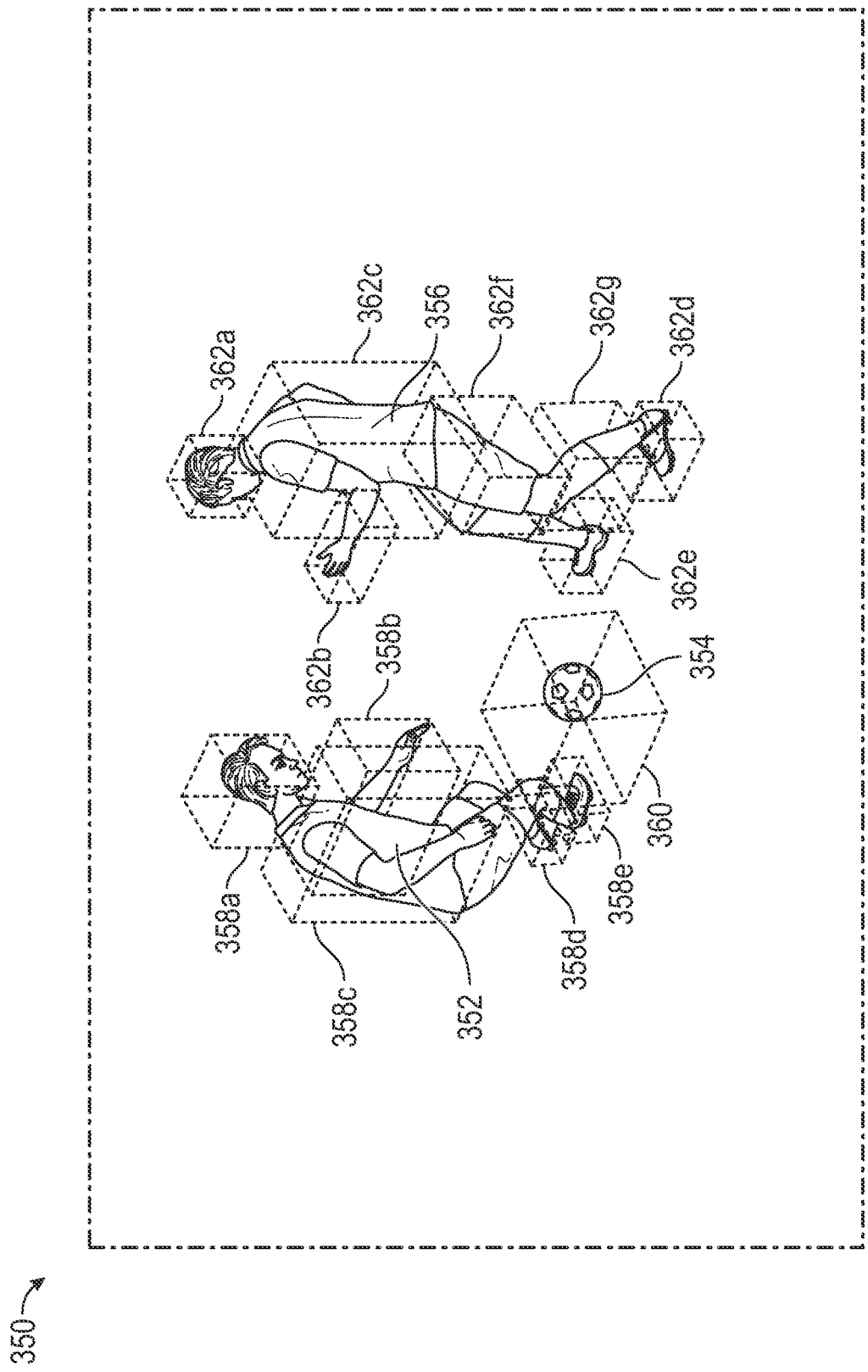

WORLD PREDICTION WITHIN A GAME APPLICATION ENVIRONMENT

BACKGROUND

In video games, characters collide with other character or other objects. For example, two players in a sports video game may collide when a player attempts to steal the ball from another player. In another example, a ball colliding with the hand of a player may trigger rules of the game, such as a handball rule. When players collide, it can trigger different movement animations and events within the game. If the collision has not been predicted, the result of the collision may result in incorrect or bizarre animations and actions, such as clipping. The ability to predict and, in some circumstance, avoid collisions may provide better simulation and realism within the video game. However, predicting collisions can be difficult to and utilize a significant amount of computing resources.

SUMMARY OF EMBODIMENTS

The systems, methods, and devices of this disclosure each have several innovative aspects, no single one of which is solely responsible for all of the desirable attributes disclosed herein.

One embodiment discloses a computer-implemented method for world prediction within a game application, the method comprising: by a hardware processor configured with computer executable instructions, executing a game application including a game environment, the game environment including a plurality of virtual objects, wherein each of the plurality of virtual objects is associated with positional data; generating a plurality of instances, wherein each instance includes a future projection of a first set of the plurality of virtual objects by a set number of frames; determining the position of a bounding box associated with each of the plurality of virtual objects in the first set in each of the plurality of instances based at least in part on the positional data corresponding to individual virtual objects of the first set; predicting a collision between two or more virtual objects of the plurality of virtual objects in the first set, wherein predicting the collision includes: determining if overlap occurs between the individual bounding boxes of the two or more virtual objects, in response to a determination that the individual bounding boxes of the two or more virtual objects overlap, generating at least one nearfield bounding box for each of the two or more virtual objects, and determining if overlap occurs between the at least one nearfield bounding boxes of the two or more virtual objects; in response to a determination that individual nearfield bounding boxes of the two or more virtual objects overlap, generating collision data based on a predicted collision; and generating an action for at least one virtual object of the plurality of virtual objects based on the collision data.

Various embodiments of the method may include one, all, or any combination of the following features. In some embodiments, predicting the collision further includes: determining no overlap occurs between the individual bounding boxes of a first virtual object of the plurality of virtual objects in the first set and any other of the plurality of virtual objects in the first set, and deleting the first virtual object from the first set. In some embodiments, a size of the bounding box is a fixed value, wherein the fixed value is determined based on a range of motion of an associated virtual object, and wherein a centroid of the bounding box is aligned with a centroid of the associated virtual object. In some embodiments, a size of the at least one nearfield bounding box is a fixed value, wherein the fixed value is determined based on a range of motion of a subcomponent of an associated virtual object, and wherein a centroid of the nearfield bounding box is aligned with a centroid of the subcomponent of the associated virtual object. In some embodiments, the collision data includes information on a magnitude of force of the predicted collision and a location of the predicted collision on the two or more objects. In some embodiments, the method may further include filtering the collision data to remove collision data with the magnitude of force below a threshold value. In some embodiments, the method may further include filtering the collision data to remove collision data with the location matching a designated location.

Another embodiment discloses a server computing system for world prediction within a game application including: at least one hardware processor configured with computer executable instructions that configure the at least on hardware processor to: execute a game application including a game environment, the game environment including a plurality of virtual objects, wherein each of the plurality of virtual objects is associated with positional data; generate a plurality of instances, wherein each instance includes a future projection of a first set of the plurality of virtual objects by a set number of frames; determine the position of a bounding box associated with each of the plurality of virtual objects in the first set in each of the plurality of instances based at least in part on the positional data corresponding to individual virtual objects of the first set; predict a collision between two or more virtual objects of the plurality of virtual objects in the first set by: determining if overlap occurs between the individual bounding boxes of the two or more virtual objects, in response to a determination that the individual bounding boxes of the two or more virtual objects overlap, generating at least one nearfield bounding box for each of the two or more virtual objects, and determining if overlap occurs between the at least one nearfield bounding boxes of the two or more virtual objects; in response to a determination that individual nearfield bounding boxes of the two or more virtual objects overlap, generating collision data based on a predicted collision; and generate an action for at least one virtual object of the plurality of virtual objects based on the collision data.

Various embodiments of the system may include one, all, or any combination of the following features. In some embodiments, the at least one hardware processor is further configured to predict the collision between two or more virtual objects by: determining no overlap occurs between the individual bounding boxes of a first virtual object of the plurality of virtual objects in the first set and any other of the plurality of virtual objects in the first set, and deleting the first virtual object from the first set. In some embodiments, a size of the bounding box is a fixed value, wherein the fixed value is determined based on a range of motion of an associated virtual object, and wherein a centroid of the bounding box is aligned with a centroid of the associated virtual object. In some embodiments, a size of the at least one nearfield bounding box is a fixed value, wherein the fixed value is determined based on a range of motion of a subcomponent of an associated virtual object, and wherein a centroid of the nearfield bounding box is aligned with a centroid of the subcomponent of the associated virtual object. In some embodiments, the collision data includes information on a magnitude of force of the predicted collision and a location of the predicted collision on the two or more objects. In some embodiments, the at least one hardware processor is further configured to filter the collision data to remove collision data with the magnitude of force below a threshold value. In some embodiments, the at least one hardware processor is further configured to filter the collision data to remove collision data with the location matching a designated location.

Another embodiment discloses a non-transitory computer readable medium including computer-executable instructions for world prediction within a game application including that, when executed by at least one processor of a computing system, causes the computing system to: execute a game application including a game environment, the game environment including a plurality of virtual objects, wherein each of the plurality of virtual objects is associated with positional data; generate a plurality of instances, wherein each instance includes a future projection of a first set of the plurality of virtual objects by a set number of frames; determine the position of a bounding box associated with each of the plurality of virtual objects in the first set in each of the plurality of instances based at least in part on the positional data corresponding to individual virtual objects of the first set; predict a collision between two or more virtual objects of the plurality of virtual objects in the first set by: determining if overlap occurs between the individual bounding boxes of the two or more virtual objects, in response to a determination that the individual bounding boxes of the two or more virtual objects overlap, generating at least one nearfield bounding box for each of the two or more virtual objects, and determining if overlap occurs between the at least one nearfield bounding boxes of the two or more virtual objects; in response to a determination that individual nearfield bounding boxes of the two or more virtual objects overlap, generating collision data based on a predicted collision; and generate an action for at least one virtual object of the plurality of virtual objects based on the collision data.

Various embodiments of the non-transitory computer readable medium may include one, all, or any combination of the following features. In embodiments, the computing system is further configured to predict the collision between two or more virtual objects by: determining no overlap occurs between the individual bounding boxes of a first virtual object of the plurality of virtual objects in the first set and any other of the plurality of virtual objects in the first set, and deleting the first virtual object from the first set. In some embodiments, a size of the bounding box is a fixed value, wherein the fixed value is determined based on a range of motion of an associated virtual object, and wherein a centroid of the bounding box is aligned with a centroid of the associated virtual object. In some embodiments, a size of the at least one nearfield bounding box is a fixed value, wherein the fixed value is determined based on a range of motion of a subcomponent of an associated virtual object, and wherein a centroid of the nearfield bounding box is aligned with a centroid of the subcomponent of the associated virtual object. In some embodiments, the collision data includes information on a magnitude of force of the predicted collision and a location of the predicted collision on the two or more objects. In some embodiments, the computing system is further configured to filter the collision data to remove collision data with the location matching a designated location.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 3C illustrates an embodiment of nearfield bounding boxes associated with virtual objects.

DETAILED DESCRIPTION OF EMBODIMENTS

Overview

Figure 1A:
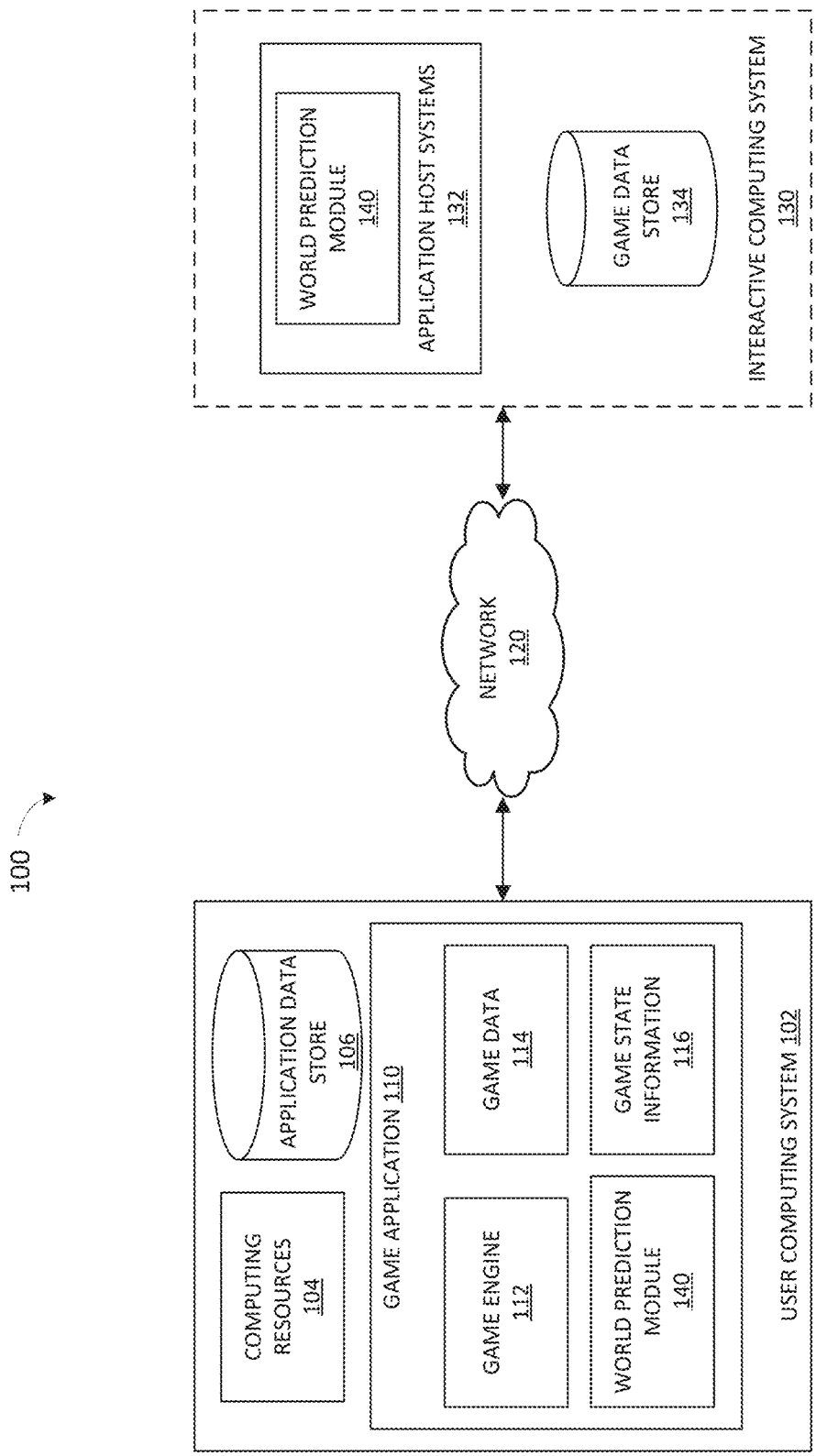
FIG. 1A illustrates an embodiment of a computing environment for implementing a world prediction module.

One of the problems encountered in video games is predicting, addressing, and animating collisions within a game environment. Some video games, for example sports video games, are increasingly more lifelike and closer to a true simulation of the real-world equivalent of a sport. However, collision interactions in video games may not result in realistic outcomes that would be expected within a real-world simulation. For example, collision prediction may result in a false positive, resulting in a character attempting to avoid a collision that did not happen. In another example, a collision that should have been predicted may occur, resulting in a character collision that a human in an analogous situation would have avoided or resulting in bizarre animations. In another example, an unexpected collision may result in the character performing an action that does not mimic real-world physics. In each of the above, and in other examples, inadequate collision recognition can inhibit the playability and real-world accuracy of a video game.

Another challenge to predicting collisions within the game environment is the varying computing resources of the devices running a video game. For example, a video game may be run on both very robust computing systems and on limited computing systems. The simulating and/or predicting operations that are used in recognizing collisions may be computationally expensive. The ability of a system to predict collisions with consistency and accuracy may not be effective unless it can be used by all systems that may run the video game, especially in a multiplayer game.

One solution to aspects of these problems is to provide world prediction in the video game that generates predictive collision information for virtual entities with a virtual environment. The present disclosure relates to a system for generating predictive collision information within a game environment through world prediction. A world prediction module can help address the problems of real-world simulation and varying computing resources.

A game environment can include a plurality of virtual objects. Virtual objects can be fixed (e.g., the virtual object is not free to move about the game environment) or movable (e.g., the virtual object may vary position and other attributes in the game environment). The virtual objects can include player controlled and non-player controlled virtual entities. The virtual entities may be associated with positional data such as a position in a game environment and/or vector information indicating the magnitude and direction of movement at any given instance or frame.

Virtual entities may be associated with pose data and action states. Pose data may be used to animate the virtual entity. For example, a virtual entity may be a human football player and the pose data may be used to position the arms and legs of the character for each frame of animation. Pose data may be updated in a video game by a posewriter function within the game. A posewriter function may use game data, such as a game engine, to determine the pose data. An action state may be used to initiate an action. The action state of a character may cause the character to begin an action on the next frame. For example, an action state may cause a character to begin a jump motion on the next frame. The action state of each character may be updated by a character controller (also referred to as a controller update) associated with each character. For example, at each frame the character controller updates the action state based on game data.

At each frame, the world prediction module simulates the game environment into one or more future instances. The world prediction module collects collision information from the future instances where two or more virtual objects are simulated to collide. The world prediction module can use the collision information to update the action state of one or more virtual entities so that the agent can account for the collision in future frames. In some embodiments the agent virtual objects use the collision information to avoid collisions.

Overview of Video Game Environment

FIG. 1A illustrates an embodiment of a computing environment 100 for implementing world prediction modules 140. The environment 100 includes a network 120, a plurality of user computing systems 102 and an interactive computing system 130, which includes application host systems 132 and a game data store 134. To simplify discussion and not to limit the present disclosure, FIG. 1A illustrates only one user computing system 102 and one interactive computing system 130, though multiple systems may be used. The user computing system 102 may communicate via a network 120 with the interactive computing system 130. Although only one network 120 is illustrated, multiple distinct and/or distributed networks 120 may exist.

User Computing System

The user computing system 102 includes computing resources 104 and an application data store 106. The user computing system 102 may have varied local computing resources 104 such as central processing units and architectures, memory, mass storage, graphics processing units, communication network availability and bandwidth, and so forth. Further, the user computing system 102 may include any type of computing system. For example, the user computing system 102 may be any type of computing device, such as a desktop, laptop, video game platform/console, television set-top box, television (for example, Internet TVs), network-enabled kiosk, car-console device, computerized appliance, wearable device (for example, smart watches and glasses with computing functionality), and wireless mobile devices (for example, smart phones, PDAs, tablets, or the like), to name a few. A more detailed description of an embodiment of a computing system 102 is described below with respect to FIG. 8.

Game Application

The user computing system 102 can execute a game application 110 based on software code stored at least in part in the application data store 106. The game application 110 may also be referred to as a videogame, a game, game code and/or a game program. A game application 110 should be understood to include software code that a computing device 102 can use to provide a game for a user to play. A game application 110 may comprise software code that informs a computing device 102 of processor instructions to execute but may also include data used in the playing of the game, such as data relating to constants, images, route information, and other data structures. In the illustrated embodiment, the game application 110 includes a game engine 112, game data 114, game state information 116, and a world prediction module 140.

In some embodiments, the user computing system 102 is capable of executing a game application 110, which may be stored and/or executed in a distributed environment. For example, the user computing system 102 may execute a portion of a game and a network-based computing system, may execute another portion of the game. For instance, the game may be an online multiplayer game that includes a client portion executed by the user computing system 102 and a server portion executed by one or more application host systems 132.

Game Engine

The game engine 112 can be configured to execute aspects of the operation of the game application 110 within the user computing system 102. Execution of aspects of gameplay within a game application can be based, at least in part, on the user input received, the game data 114, and game state information 116. The game data 114 can include game rules, animation data, environmental settings, constraints, skeleton models, route information, and/or other game application information.

The game engine 112 can execute gameplay within the game according to the game rules. Examples of game rules can include rules for scoring, possible inputs, actions/events, movement in response to inputs, and the like. Other components can control what inputs are accepted and how the game progresses, and other aspects of gameplay. The game engine 112 can receive the user inputs and determine in-game events, such as actions, jumps, runs, throws, attacks and other events appropriate for the game application 110. During runtime operation, the game engine 112 can read in game data 114 and game state information 116 to determine the appropriate in-game events.

In one example, after the game engine 112 determines the character events, the character events can be conveyed to a movement engine that can determine the appropriate motions the characters should make in response to the events and passes those motions on to a physics engine. The physics engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which generates a new frame for display to the user. The process can be repeated for rendering each frame during execution of the game application. Though the process has been described in the context of a character, the process can be applied to any process for processing events and rendering the output for display to a user.

Game Data

The game data 114 can include game rules, prerecorded motion capture poses/paths, environmental settings, environmental objects, constraints, skeleton models, route information, and/or other game application information. At least a portion of the game data 114 can be stored in the application data store 106. In some embodiments, a portion of the game data 114 may be received and/or stored remotely, such as in the game data store 134. In such embodiments, game data may be received during runtime of the game application.

Game State Information

During runtime, the game application 110 can store game state information 116, which can include a game state, character states, environment states, scene object storage, route information and/or other information associated with a runtime state of the game application 110. For example, the game state information 116 can identify the state of the game application 110 at a specific point in time, such as a character position, character orientation, character action, game level attributes, and other information contributing to a state of the game application. The game state information can include dynamic state information that continually changes, such as character movement positions, and static state information, such as the identification of a game level within the game.

World Prediction Module

The world prediction module 140 can use game state information 116, game data 114, the game engine 112, and/or information received from the interactive computing system 130 via the network 120 to generate predicted collision information during runtime of the game application 110. In some embodiments, at least a portion of the world prediction module 140 occurs on the user computing system 102. In some embodiments, at least a portion of the world prediction module occurs on the application host systems 132 of the interactive computing system 130 and is transmitted to the game application 110 via the network 120.

The world prediction module 140 can generate predict and/or simulate execution of the game application 110 at future time steps. The world prediction module 140 can use predicted collision information as input for determining an action state of virtual entities within the game application. The world prediction module 140 can identify potential collisions between virtual objects within the game environment. For example, the game application 110 may the use the world prediction module 140 to identify a potential collision to cause a virtual entity to prepare for the collision (e.g., update the action state of an agent to cause the agent to begin avoiding the predicted collision). Functions of the world prediction module 140 can include dynamically determining collision information between two or more virtual objects, filtering collision information, and other world prediction function within the game environment. Various aspects of the operation of the world prediction module 140 are described in further detail below.

Interactive Computing System

The interactive computing system 130 may include application host systems 132 and a game data store 134. In some embodiments, the interactive computing system 130 can include one or more computing devices, such as servers and databases that may host and/or execute a portion of one or more instances of the game application 110. In some embodiments, the application host systems 132 can include one or more computing devices, such as servers and databases that may host and/or execute a portion of one or more instances of the game application 110. In certain embodiments, instead of or in addition to executing a portion of the game application 110, the application host systems 132 may execute another application, which may complement and/or interact with the game application 110 during execution of an instance of the game application 110, such as a world prediction module 140.

The interactive computing system 130 may enable multiple users or computing systems to access a portion of the game application 110 executed or hosted by the interactive computing system 130. The interactive computing system 130 can have one or more game servers that are configured to host online video games. For example, the interactive computing system 130 may have one or more game servers that are configured to host an instanced (e.g., a first person shooter multiplayer match) or a persistent virtual environment (e.g., a multiplayer online roll playing game). The virtual environment may enable one or more users to interact with the environment and with each other in a synchronous and/or asynchronous manner. In some cases, multiple instances of the persistent virtual environment may be created or hosted by one or more game servers. A set of users may be assigned to or may access one instance of the virtual environment while another set of users may be assigned to or may access another instance of the virtual environment. In some embodiments, the interactive computing system 130 may execute a hosting system for executing various aspects of a game environment. For example, in one embodiment, the game application 110 may be a competitive game, such as a first person shooter or sports game, and the interactive computing system 130 can provide a dedicated hosting service (such as, through the game servers) for hosting multiplayer game instances or facilitate the creation of game instances hosted by user computing systems 102.

Application Host System

The interactive computing system 130 may enable multiple users or computing systems to access a portion of the game application 110 executed or hosted by the interactive computing system 130. In some embodiments, the application host system 132 may execute a hosting system for executing various aspects of a game environment. For example, in one embodiment, the game application 110 can record the location of characters within the game environment. In some embodiments, the game application 110 may be a single player or online multiplayer game in which the interactive computing system 130 provides additional functionality when connected to the instance of the game application 110. For example, the interactive computing system 130 can provide additional information to the world prediction module 140 based on aggregated information received from a plurality of users operating the same game application 110. In some embodiments, the application host system 132 can provide a dedicated hosting service for hosting multiplayer game instances or facilitate the creation of game instances hosted by user computing systems 102. In some embodiments, the host application system 132 can provide a lobby or other environments for users to virtually interact with one another.

World Prediction Module

In some embodiments, at least a portion of the world prediction module 140 may be contained in the application host system 132. As such, the application host system 132 may perform some or all of the world prediction module 140 described above with reference to the game application 110. Various aspects of the operation of the world prediction module 140 are described in further detail below.

Game Data Store

The interactive computing system 130 can include one or more game data stores 134 that are configured to store information associated with game application 110 hosted by the interactive computing system 130 and/or the application host systems 132. The game data stores 134 can include information associated with the game application 110 that is generated and aggregated by the world prediction module 140. For example, the game data stores 134 can include collision information and other information used by the world prediction module 140. In some embodiments, one or more game data stores 134 are configured to store user account information associated with one or more game applications. The user account information can include source assets associated with a user account.

Network

The network 120 can include any type of communication network. For example, the network 120 can include one or more of a wide area network (WAN), a local area network (LAN), a cellular network, an ad hoc network, a satellite network, a wired network, a wireless network, and so forth. In some embodiments, the network 120 can include the Internet.

Instance Compilation

Figure 1B:
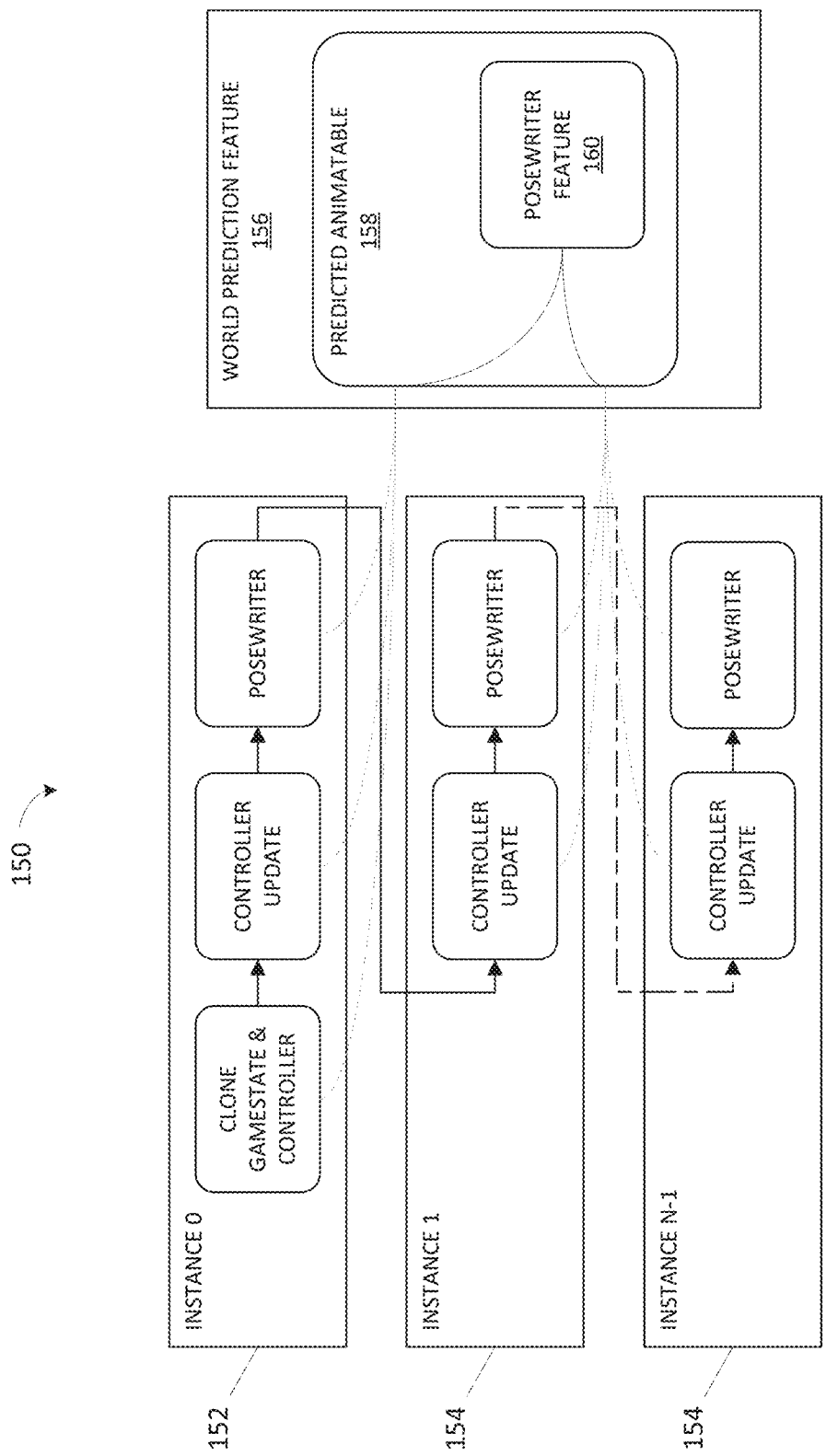
FIG. 1B illustrates an embodiment of various functions and routines that can be implemented by the world prediction module in order to generate collision information for the use within a game application.

FIG. 1B illustrates an embodiment of various functions and routines that can be implemented by the world prediction module 140 in order to generate collision information for the use within the game application 110. The world prediction module 140 can be configured to generate collision information during runtime of the game application. The world prediction module 140 can be configured to generate a plurality on instances in order to generate the predicted collision information. The instances can include an initial instance generating module 152, subsequent instance generating modules 154, and a world prediction feature 156. In some embodiments, at least a portion of the world prediction module 140 may be found in the user computing system 102 and/or in the interactive computing system 130.

The world prediction feature 156 can include one or more instances of predicted virtual environments that are separate from a runtime instance of the virtual environment visible to the user. The world prediction feature 156 can generate one or more predicted animatables 158 associated with an animatable virtual object within the predicted virtual environment. Each predicted animatable may include a posewriter feature 160 configured to configure the animatable virtual object in a specific position and pose within a virtual environment. The separate virtual environments may use some or all of the features of the game engine 112 of the user computing system 102 or some or all of the features of the interactive computing system 130. For example, the world prediction module 140 may compile one or more simplified virtual environments that omits object textures, lighting, color, or any other feature that is not associated with object collisions. A predicted virtual environment may be compiled for each instance used by the world prediction module 140. Each instance can represent the game environment at a specific point in time. For example, the world prediction module 140 may use a defined number of instances (such as, for example, 2, 5, 8, 10, or any number of predictive instances) to predict player collisions. Each instance may represent the game environment offset by a set number of frames (e.g., the first instance is the game environment offset by four frames, the second instance is offset by eight frames, and so on). The world prediction feature 156 can generate a copy of the controller and posewriter for animatable virtual objects in all instances. In some embodiments, multiple instances may be compiled in a single game environment. For example, multiple copies of each virtual object may be generated within the same virtual environment (such as illustrated in FIG. 3B).

The number of instances that are generated may be dynamically determined based on various factors, such as the game application 110, the type of game application, available computing resources, number of players within a game, gameplay mode, the strength of the network connection, the availability of computing resources 104, the availability of servers and processors on the interactive computing system 130, the number objects within virtual environment, and/or other factors that contribute the complexity of the prediction. In some embodiments, the number of instances may be predetermined.

The number of frames between instances can be a defined number. (e.g., instance 1 is offset by 4 frames, instance 2 is offset by 8 frames, and so on). The number of frames between instances can be predetermined or dynamically determined during runtime of the game application 110. The number of frames between instances may be based on the available computing resources 104, the strength of the network connection, the availability of dynamic components of the computing resources 104, the availability of servers and processors on the interactive computing system 130, the number of objects within the virtual environment, and/or other factors that contribute the complexity of the prediction.

In some embodiments, the initial instance 152 and subsequent instances 154 can populate the instances with the predicted position of virtual objects corresponding to the time step associated with the instance. The initial instance generating module 152 may clone the gamestate (e.g., the positional information) and controller for each animatable virtual object. The initial instance generating module 152 may then update the controller and posewriter function in an associated instance. The position of each animatable virtual objects can be determined for instance and a corresponding predicted animatable 158 can be generated within the instance.

In subsequent instances 154 the instance can projected from the previous instance by a defined number of frames. In one example, defined number of frames is 1 frame and the virtual environment of the associated instance may have the animatable virtual objects placed in fixed positions projected by 1 frame. In another example, defined number of frames is 4 frames and the virtual environment of the associated instance may have the animatable virtual objects placed in fixed positions projected by 4 frames. It should be noted that other number of frames between each instance may be used.

In some embodiments, the subsequent instance generating module 154 may update the controller and the posewriter function for additional instances, each separated from the previous instance by a number of frames. For example, if the world prediction module 140 uses 8 instances, the subsequent instance generating module 154 would update the controller and the poserwiter function of six additional instances. Each of the additional instances may be separated by the number of frames, for example one frame. As a result, the world prediction feature 156 may comprise eight virtual environments associated with a predicted animatable 158 positioned at a predicted location one frame in the future. While eight instances and one frame are used in the above example, other values may be used to adjust the precision of the world prediction module 140.

Embodiment of Instances of a Virtual Object

Figure 2:
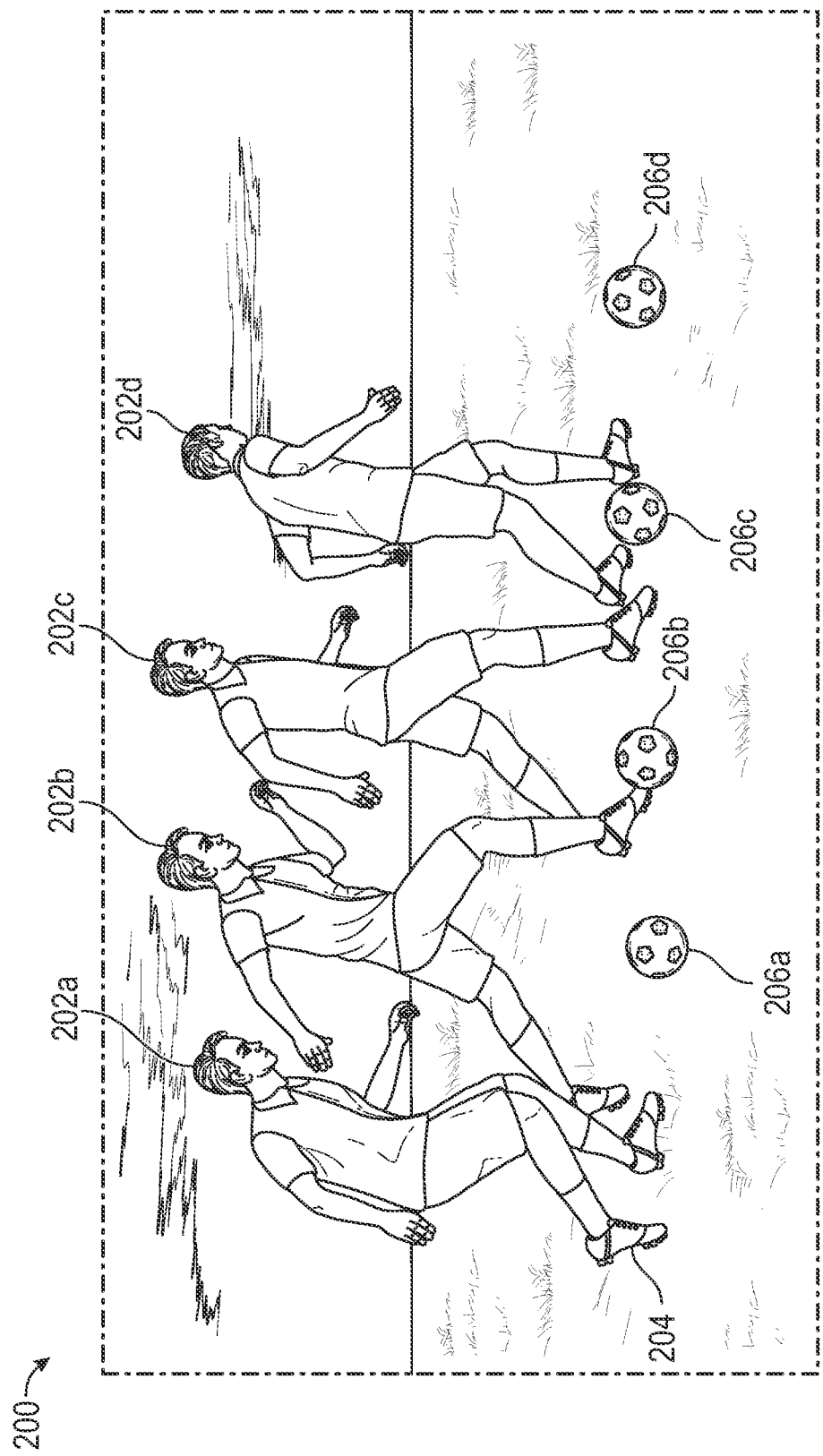
FIG. 2 illustrates an embodiment of animatable virtual objects projected into multiple instances compiled by the world prediction module.

FIG. 2 illustrates an embodiment of animatable virtual objects projected into multiple instances compiled by the world prediction module 140. In the embodiment, a first animatable virtual object 202 (e.g., a player in a sports video game) is projected into instances of the player 202a-202d and a second animatable virtual object 206 (e.g., a ball) is projected into instances of the ball 206a-206d. While the position of the player 202a-202d and the ball 206a-206d are shown in a single virtual environment 200, more virtual environments may be used in association with the instances. For example, individual virtual environments may be used for each instance. The predicted position of each instance of player 202a-202d and ball 206a-206d may be determined by the world prediction module 140 based in part on the game engine 112, the game data 114, and/or the game state information 116.

In an embodiment, each instance of the player 202a-202d has an associated pose that is generated by the world prediction module 140. Each pose may be determined by the world prediction module 140 based in part on the game engine 112, the game data 114, and/or the game state information 116 through a posewriter function.

In the embodiment, the instances of the player 202a-202d and the instances of the ball 206a-206d may be separated by a number of frames. For example, the player 202a-202d and the instances of the ball 206a-206d may each be separated by four frames. In such an example, the associated pose of each instance of the player 202a-202d may be a projection of the pose of the player 202 at four frames, eight frames, twelve frames, and sixteen frames from the current frame.

An animatable virtual object may have no modifiable pose. For example, instances of the ball 206a-206d may only have an associated position in a virtual environment, such as virtual environment 200. A pose of an animatable virtual object can be based on positioning of each of the components of the virtual object, such as, for example, the feet, legs, torso, and arms.

As discussed with reference to FIG. 1B, the number of instances may be different than is illustrated in FIG. 2. For example, less than four instances or more than four instances may be used. Similarly, the number of frames that separate the instances may be different than is described above. For example, less than four frames may separate each instance, or more than four frames may separate each instance.

Collision Prediction

Figure 3A:
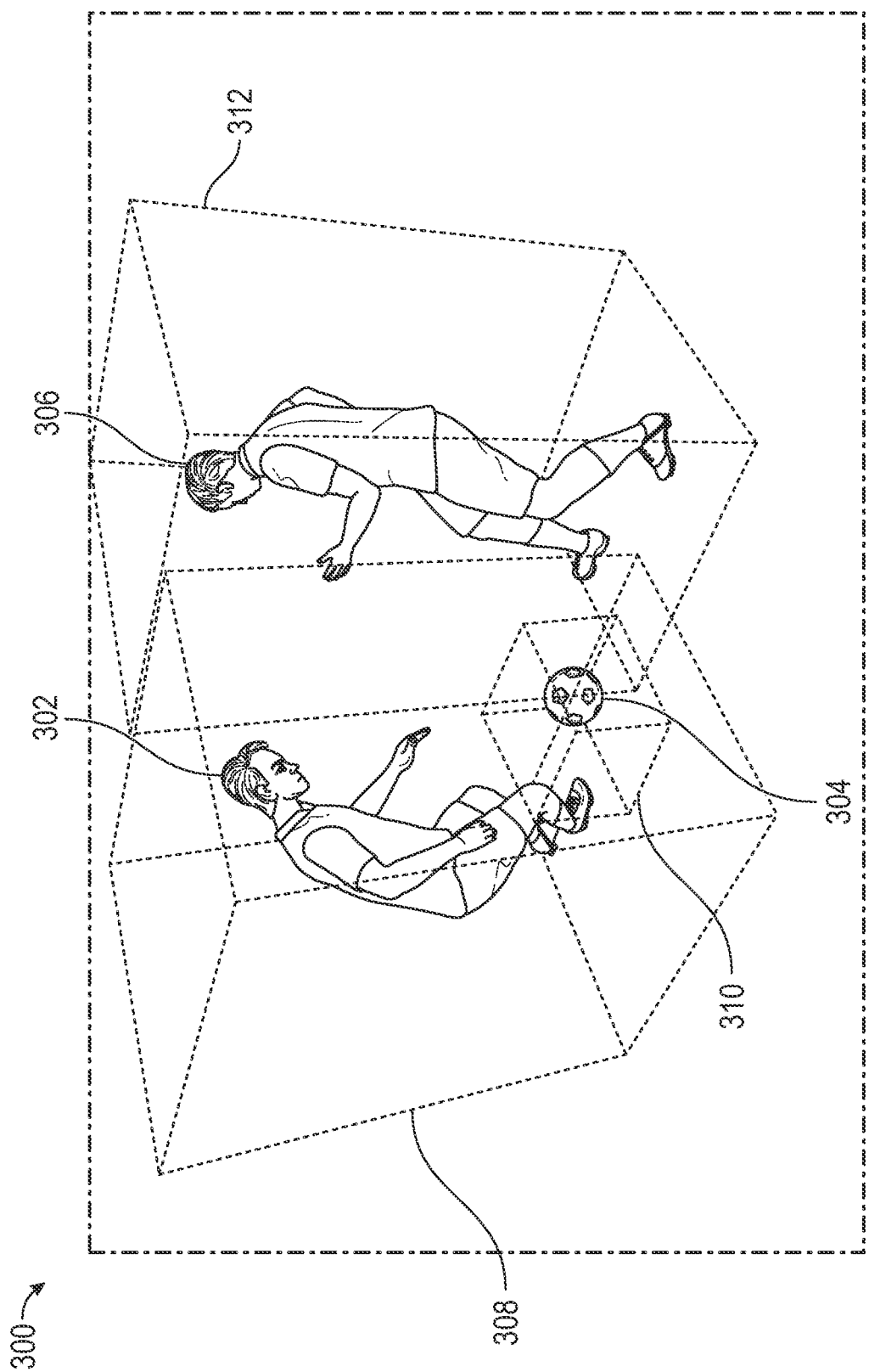
FIG. 3A illustrates an embodiment of farfield bounding boxes associated with virtual objects.
Figure 3B:
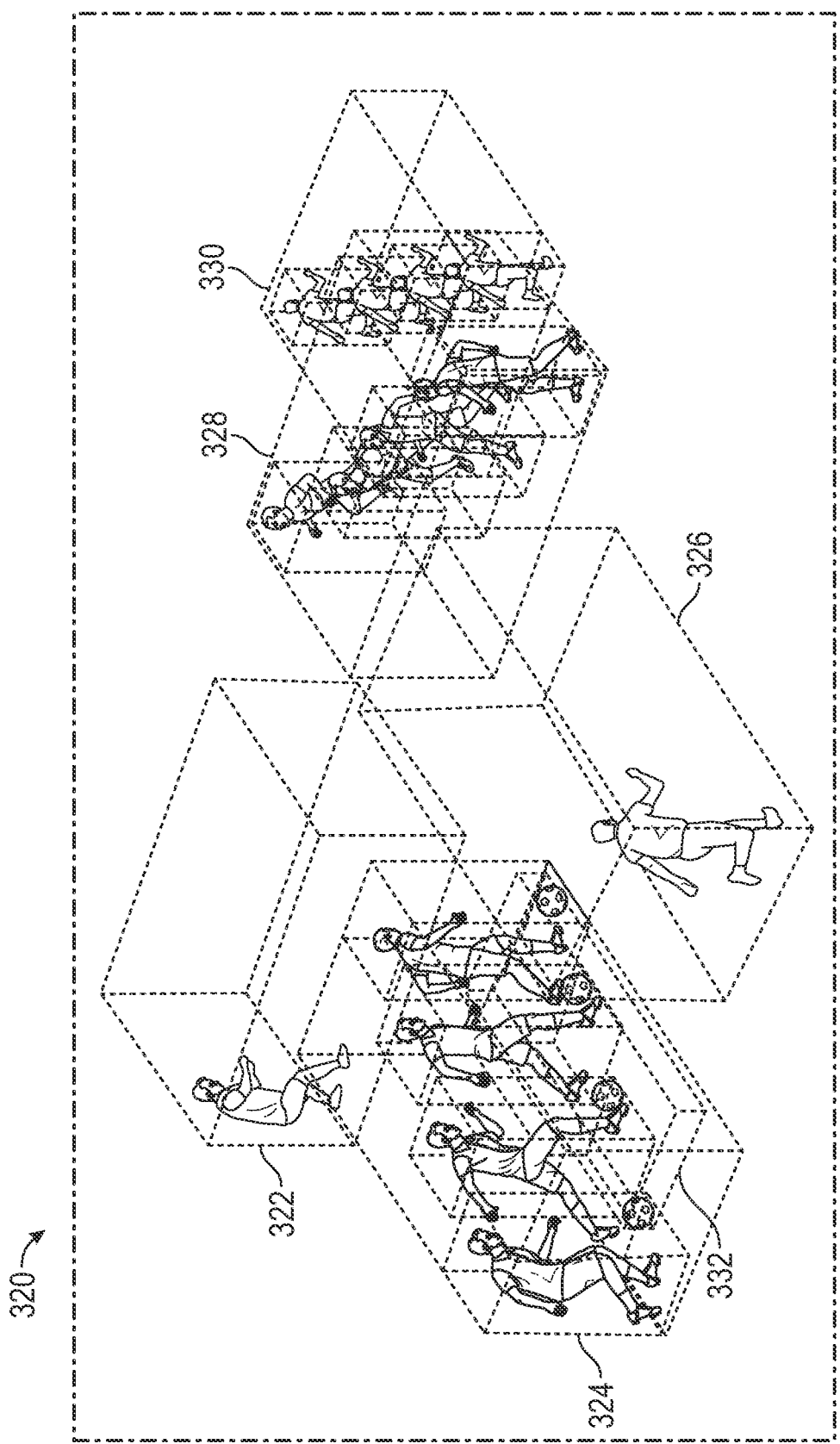
FIG. 3B illustrates an embodiment of the world prediction module illustrating the farfield bounding boxes for each predictive instance.

FIGS. 3A-3C illustrate embodiments of various function and routines that can be implemented by the world prediction module 140 in order to generate collision information for the use within the game application 110. The world prediction module 140 can be configured to generate collision information within an instance of the virtual environment. A game environment can be formed from structural elements (such as meshes) that define the structures within an environment. For example, a game environment could be a sports pitch, a city, a jungle, a spaceship, or any other type of virtual environment in accordance with the specific parameters of the game application. The game environments can be constructed in two-dimensional and three-dimensional environments. In some embodiments, characters within the environments can have the freedom to move in all directions according to a Cartesian coordinate system (such as along x, y, and z axes).

The game environment may contain virtual objects. The virtual objects may be fixed in a position (e.g., a fixed virtual object). For example, the fixed virtual object may be a goalpost that is placed in a fixed position within the game environment. The virtual objects may also have variable position (e.g., an animatable virtual object). For example, the animatable virtual object may be a ball that has freedom of movement along one or more axes of the game environment. The animatable virtual objects may have agency (i.e., an agent virtual object). An agent may move in the game environment based in part on an action state associated with the agent. An action state may be game data 114 that is generated by the world prediction module 140 that is configured to cause the agent to move in a specific way on the next frame of the game application. For example, an action state may cause an agent to kick a leg, jump, move a hand, etc. In some embodiments, the world prediction module 140 populates the action state of an agent virtual object by determining if the agent virtual object collides with another virtual object in the game environment.

Farfield Bounding Box

FIG. 3A illustrates an embodiment of farfield bounding boxes associated with virtual objects. A bounding box is a set of boundaries around a virtual object. For example, a farfield bounding box may comprise a set of boundaries for each axis of the virtual environment (e.g., for a three-dimensional environment a bounding box may have two boundary coordinates on the x-axis, two boundary coordinates on the y-axis, and two boundary coordinates on the z-axis). The size of a bounding box may be determined by the range of motion of the associated virtual object over the timeframe between predictive instances. In some embodiments, the centroid of a bounding box is aligned to the centroid of a virtual object.

In some embodiments, a farfield bounding box is a bounding box that represents the predicted range of motion for a virtual object over a time period, such as a set number of frames (e.g., four frames). For example, the positional data associated with a virtual object may comprise a vector representing the velocity of the centroid of a virtual object and a total distance the virtual object may reach at any given instance. The farfield bounding box may be two-dimensional or three-dimensional space around the virtual object. The farfield bounding box can be a course predictor of potential movement for a virtual object. A base size and shape of the farfield bounding box can be based on potential movement of the virtual object from a centroid. The farfield bounding box can be expanded based on potential movement of a centroid of the virtual object over the time period.

In some embodiments, the world prediction module 140 creates farfield bounding boxes for each instance of a virtual object, for example each instance of the player 202a-202d of FIG. 2. The world prediction module 140 determines whether the farfield bounding box of any virtual object overlaps with the farfield bounding box of another virtual object. The world prediction module 140 determines whether an overlap occurs between two or more bounding boxes within a predictive instance. For example, an overlap occurs when any portion of a farfield bounding box intersect with another farfield bounding box.

In the illustrated example, virtual environment 300 contains a first virtual object (representing a first player) 302, a second virtual object (representing a ball) 304, and a third virtual object (representing a second player) 306. The first player 302 is associated with a first farfield bounding box 308, the ball 304 is associated with a second farfield bounding box 310, and the second player 306 is associated with a third farfield bounding box 312. In the illustrated example, the first farfield bounding box 308 overlaps with both the second farfield bounding box 310 and the third farfield bounding box 312. Likewise, the third farfield bounding box 312 also overlaps with the second farfield bounding box.

FIG. 3B illustrates an embodiment of the world prediction module 140 illustrating the farfield bounding boxes for each predictive instance. The farfield bounding boxes are generated for each predictive instance. The world prediction module 140 can parse each farfield bounding box of each instance and determine if overlap occurs between any of the farfield bounding boxes. In the illustrated embodiment virtual environment 320 comprises a first virtual object (first player) 322, a second virtual object (second player) 324, a third virtual object (third player) 326, a fourth virtual object (fourth player) 328, a fifth virtual object (fifth player) 330, and a sixth virtual object (ball) 332.

In the illustrated embodiment, each virtual object is associated with four predictive instances. The second player 324 and the ball 332 are illustrated as having overlapped farfield bounding boxes in one or more instance. Similarly, the fourth player 328 and the fifth player 330 are illustrated as having overlapped farfield bounding boxes in one or more instance. In contrast, the first player 322 and the third player 326 are illustrated as having no overlapped farfield bounding boxes in any instance.

In some embodiments, after the overlap between farfield bounding boxes has been determined, the system can delete the instances of a virtual object from the predictive instance when no overlap between farfield bounding boxes is determined. For example, the instances of the first player 322 and the third player 326 may be deleted from the instance. In some embodiments, virtual objects are deleted from the instances to save computer resources such a processing resources, memory resources, and the like. In some embodiments, virtual objects are deleted from the instances to reduce the number of virtual objects world prediction module 140 considers during the next phase of the collision analysis.

Nearfield Bounding Boxes

FIG. 3C illustrates an embodiment of nearfield bounding boxes associated with virtual objects. After a potential collision between farfield bounding box has been determined, the system can use nearfield bounding boxes to determine whether a collision will occur and to what extent. A nearfield bounding box is a bounding box that represents a range of motion for a subcomponent of a virtual object (e.g., hands, arms, legs, etc.) over a set number of frames. In some embodiments the total range of motion for a subcomponent of a virtual object is defined in terms of kinematics (i.e., rules of motion defined by the structural model of the virtual object). For example, a virtual object representing a human player may have a structural model based on a simulated skeletal and muscular structure. In such an example, the kinematics of the virtual object may be used to define a range of motion of the simulated skeletal and muscular structure. As a result, a nearfield bounding box of a subcomponent of the virtual object (e.g., a hand or foot of the human player) may represent the total range of motion limited by the simulated structural rules that govern movement of the subcomponent (e.g., rules that define range of motion of a foot).

The world prediction module 140 can create nearfield bounding boxes for each instance of a virtual object where there is an overlap between farfield bounding boxes, such as illustrated in FIG. 3C. The world prediction module 140 can determine if any of the nearfield bounding boxes of a virtual object overlap with any of the nearfield bounding boxes of another virtual object. The world prediction module 140 can use the nearfield bounding box to determine the type and magnitude of force of the predicted collision between the virtual objects. The world prediction module 140 can identify which subcomponents of a virtual object will collide with the subcomponents of the other virtual object(s) and the magnitude of the collision.

In the illustrated embodiment, virtual environment 350 contains a first virtual object (representing a first player) 352, a second virtual object (representing a ball) 354, and a third virtual object (representing a second player) 356. The first player 352 is associated with a plurality of nearfield bounding boxes 358a-358e. The second player 356 is associated with a plurality of nearfield bounding boxes 362a-362g. Each nearfield bounding box represents a defined subcomponent of the virtual objects. For example, nearfield bounding box 358a may represent the head and neck of first player 352. In some embodiments, nonagent virtual objects, such as ball 354, do not have subcomponents. As such, ball 354 only has one nearfield bounding box 360. It should be noted that more or fewer nearfield bounding boxes may be associated with a virtual object than is illustrated. The number of nearfield bounding boxes may be defined by the kinematics of the virtual object and/or the available computing resources to the world prediction module 140.

World Prediction Embodiment

Figure 4:
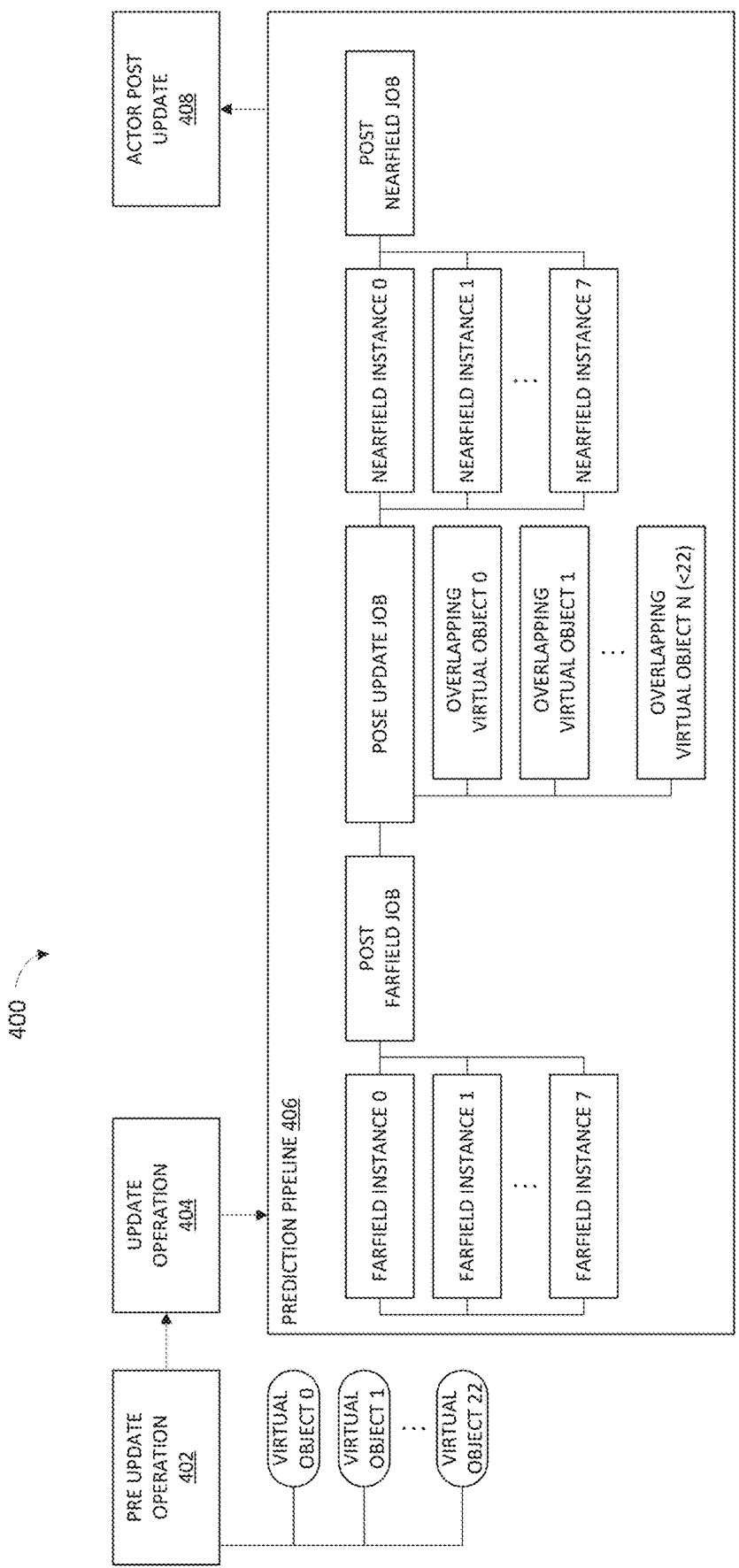
FIG. 4 illustrates a block diagrams of an embodiment of a world prediction process.

FIG. 4 illustrates an embodiment of a world prediction sequence 400. World prediction sequence 400 may be implemented by the world prediction module 140 and may include some or all of the features described in FIGS. 3A-3C. While any number of virtual objects and instance may be used in the world prediction sequence 400, for purposes of illustration twenty three virtual objects and 8 instance are shown.

At pre update operation 402, the game state and controller can be cloned for each virtual objects. For example, pre update operation 402 may perform all or some of the function of the initial instance generating module 152. In some embodiments, the game state and controller for each virtual object is stored, for example in the application data store 106, to be accessed by later operations.

At update operation 404, an action state for each virtual object is determined. In some embodiments the action state is determined through prediction pipeline 406. The prediction pipeline 406 can use the stored game state and controller for each virtual object to build a defined number of farfield instances (e.g., eight instances). Each farfield instance represents the virtual objects at a specific frame with an associated farfield bounding box, such as, for example, the farfield bounding box described in FIG. 3A. In some embodiments, the farfield bounding box of each virtual object represents a maximum range of motion over a number of frames of the virtual object.

Once the farfield instances have been determined, the prediction pipeline 406 conducts a post farfield job to check if any of the farfield bounding boxes overlap. For example, the prediction pipeline 406 may perform the operations described in FIG. 3B. Virtual objects that have no overlap in any of the farfield instances can be deleted from the prediction pipeline 406 and collision information can be stored.

The action state associated with the virtual object may be updated to indicate that the virtual object did not collide in the simulation.

For virtual objects with a farfield bounding box that overlaps with at least one other farfield bounding box, the prediction pipeline 406 conducts a pose update job. During the pose update job, the game state and controller information is used to generate a pose for each of the remaining virtual objects. In some embodiments, prior to pose generation, each virtual object can be represented entirely by the farfield bounding box (e.g., each virtual object was only represented by a center point and a range of motion). After the pose update job, each remaining virtual object is represented by a combination of subcomponents (e.g., a character now has body parts represented).

Once the pose update job has been completed, the prediction pipeline 406 generate nearfield bounding boxes based on the pose update. Each nearfield instance represents the virtual objects over a defined time frame with one or more associated nearfield bounding boxes. For example, the nearfield bounding boxes described in FIG. 3C. In some embodiments, the nearfield bounding boxes represent the potential range of motion of subcomponents of the virtual objects over the defined timeframe, such as over a number of frames. The potential range of motion of the subcomponents can be defined by the kinematics of the virtual object.

After generation of the nearfield bounding boxes, the prediction pipeline 406 conducts a post nearfield job to check if a nearfield bounding box of one virtual object overlaps with the nearfield bounding box of another virtual object. If overlap occurs between nearfield bounding boxes, the prediction pipeline 406 determines collision information associated with the virtual objects involved in the collision. For example, the collision information may include location of the collision, the magnitude of the collision, the frame the collision is to take place, and any other information used by the controller of the virtual object to animate the virtual object. The collision information may be stored in the action state associated with the virtual object.

In some instances, a virtual object that registered overlap in the farfield bounding box will not register overlap in the nearfield bounding box. This may occur because the farfield bounding boxes are a coarser analysis used to determine whether there is a potential for a collision between virtual objects. Whereas the nearfield bounding boxes provide a more detailed analysis of the potential positions of subcomponents of the virtual objects. For example, the predicted range of motion in the farfield bounding box may be larger than the range of motion defined in the nearfield bounding boxes because the range of motion is restricted to the potential motion of individual subcomponents based on the pose data. As such, some virtual objects may have no nearfield overlap and the prediction pipeline 406 may update the action state with collision information indicating that no nearfield overlap occurred.

At update operation 408, a next action is determined from the action state of each virtual object. For example, if the action state includes collision information about a collision that was predicted to occur, the next action may be to avoid the collision. In another example, if the action state includes no collision information, or collision information indicating that no collision was predicted to occur, the action state may not change from the previous frame.

Action State Update Process

Figure 5:
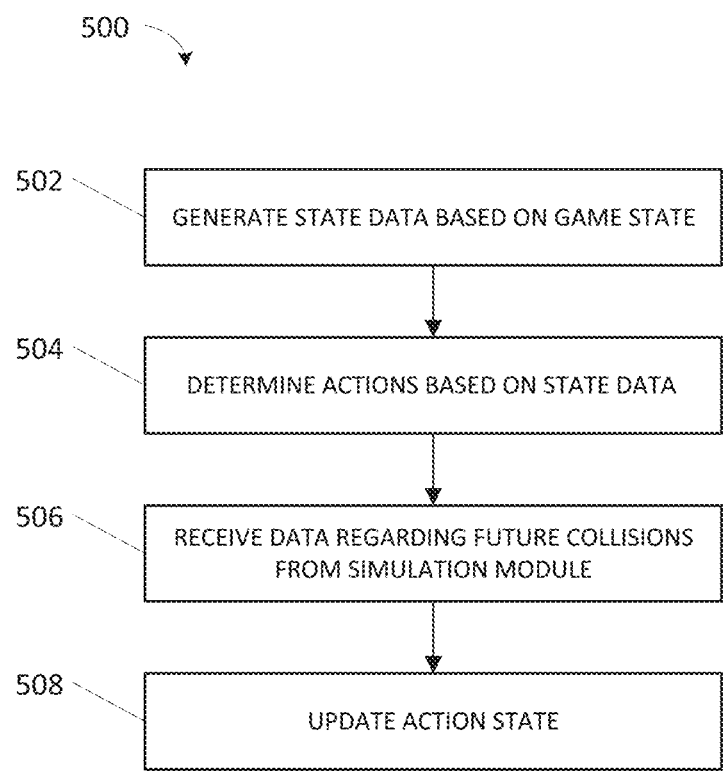
FIG. 5 illustrates an embodiment of a flowchart for a process for updating the action state of an animatable virtual object during runtime of a game application.

FIG. 5 illustrates an embodiment of a flowchart for a process for updating the action state of an animatable virtual object during runtime of a game application. The process 500 can be computer-implemented. The process 500 can be implemented by any system that can process data for a game application. For example, the process 500, in whole or in part, can be implemented by a game application 110, a game engine 112, a world prediction module 140, an interactive computing system 130, an application host system 132, and/or another system. Although any number of systems, in whole or in part, can implement the process 500, to simplify discussion, the process 500 will be described with respect to particular systems. Further, although embodiments of the process 500 may be performed with respect to variations of systems comprising various game application environments, to simplify discussion, the process 500 will be described with respect to the user computing system 102.

At block 502, generate game state data associated with current game state. For example, each agent may be associated with game data 114 and/or game state information 116. In some embodiments, the agent data may include physical information data such as positional data within a game environment.

At block 504, determine actions of virtual objects based on game state data. The simulation module will be discussed in more detail with reference to FIG. 6.

At block 506, generate collision data for each virtual object based on data regarding a projected future collision is received from the simulation module. For example, based on the physical information associated with an agent, the simulation module may project that the agent is going to collide with another virtual object. For example, the simulation module may determine that the leg of the agent is going to collide with a virtual object, such as another agent, the hand of the agent is going to collide with a virtual object, such as a ball, and so on. In some embodiments, the data regarding projected future collisions indicates that no collision is projected to occur. For example, the simulation module may project that the agent is not going to collide with another virtual object.

At block 508, the action states for the virtual objects are updated based on the collision data. The action state may be configured to cause the agent to act on the next frame. For example, an action state may cause an agent to initiate a jump on the next frame. In some embodiments, the action state may be updated in part based on the received data regarding future collisions. For example, after receiving data indicating the agent is projected to collide with a virtual object that is low to the ground, the action state of the agent may be updated to initiate a jump to avoid the collision. In another example, after receiving data indicating an unavoidable collision between the agent and another virtual object, the action state of the agent may be updated to initiate a movement to minimize the magnitude of the collision. For example, the agent may begin to raise its arms to brace for impact.

Generating Collision Data

Figure 6:
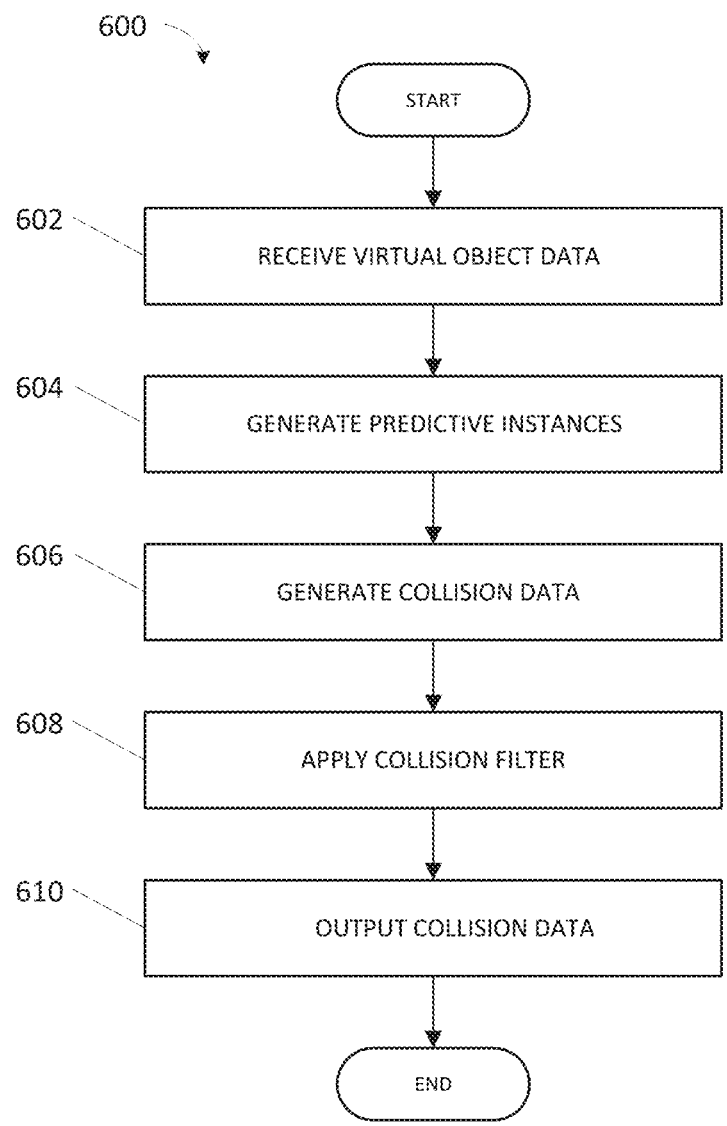
FIG. 6 illustrates an embodiment of a process for generating collision data during runtime of a game application.

FIG. 6 illustrates an embodiment of a process for generating collision data during runtime of a game application. The process 600 can be computer-implemented. The process 600 can be implemented by any system that can process data for a game application. For example, the process 600, in whole or in part, can be implemented by a game application 110, a game engine 112, a world prediction module 140, an interactive computing system 130, an application host system 132, and/or another system. Although any number of systems, in whole or in part, can implement the process 600, to simplify discussion, the process 600 will be described with respect to particular systems. Further, although embodiments of the process 600 may be performed with respect to variations of systems comprising various game application environments, to simplify discussion, the process 600 will be described with respect to the user computing system 102.

At block 602, the system receives virtual object data associated with virtual objects within the virtual environment. The data associated with the virtual objects may comprise data associated with an action state of the virtual object, which can identify actions that are being and/or will be executed by the virtual objects. The data may be associated with virtual objects within the virtual environment without an action state, such as virtual objects that are fixed (e.g., a goalpost) or movable (e.g., a ball). The data may include the movement and position data associated with the virtual objects within the virtual environment.

At block 604, the system generates a plurality of predictive instances of the predicted game state. There can be a defined number of predictive instances over a defined time period. The time period may be one or more frames. For example, system may generate eight instances, with each instance separated by one frame. The position of each virtual object within each instance may be a projection of the virtual object based on virtual object data associated with the virtual object received at block 602. For example, the virtual object may include game data associated with a position, velocity, pose, and/or other relevant factor in projection. The user computing system 102 may use that game data to project the position and/or pose the virtual object into each of the generated instances. For example, a position and pose of a virtual object, like a player character, may be projected at frame 1, frame 2, frame 3, and so on until all the desired instances are constructed.

At block 606, generate collision data associated with each virtual object within the predictive instances. The collision data can be used determine if one or more collisions occur between the virtual objects. The process for generating the collision data is discussed with reference to FIG. 7. The collision data may identity one or more collisions between virtual objects. For example, the collision data may identify that a virtual object, such as a player character, and another virtual object, such as a ball, are projected to collide in 8 frames.

At block 608, the system can filter the collision data. One or more filters can be applied to the collision data to remove some or all the collision data to prevent that data from propagating to inform an action state. The collision data can be filtered. The collision filter can be a set of operations that signals and removes collision data that meets the filtration condition. In some embodiments, the filtration condition applies to the collision information. In some embodiments, the filtration condition is one or more locations of a collision. For example, the filtration condition may signal and remove collision data associated with a projected collision between the arms of two virtual objects. In some embodiments, the filtration condition is a threshold magnitude of collision. For example, the filtration condition may signal and remove collision data associated with a projected collision that falls beneath a threshold magnitude value. In some embodiments, the filtration condition is used to remove collision data so that the collision data is not used to inform the action state of an agent. In some embodiments, incidental collisions, collisions that fall below a threshold magnitude, and/or other collisions may be undesirable to inform an action state. For example, a collision that falls below a threshold magnitude may not be helpful to inform an action state of an agent when a collision that falls above the threshold value is also projected for the same agent. Similarly, collision projected to occur on a portion of an agent may not be helpful to inform an action state of the agent. While specific examples of filtration conditions and motivations are described above, any number of filtration conditions and motivations may be used to filter out collision data from informing an action state.

At block 610, the system outputs collision data to the character controller to update the action state. For example, the filtered collision data may predict that a virtual object is going to collide with another virtual object in 8 frames. In this example, the action state data associated with the virtual objects is updated so the collision can be accounted for by the virtual object controller.

Collision Module

Figure 7:
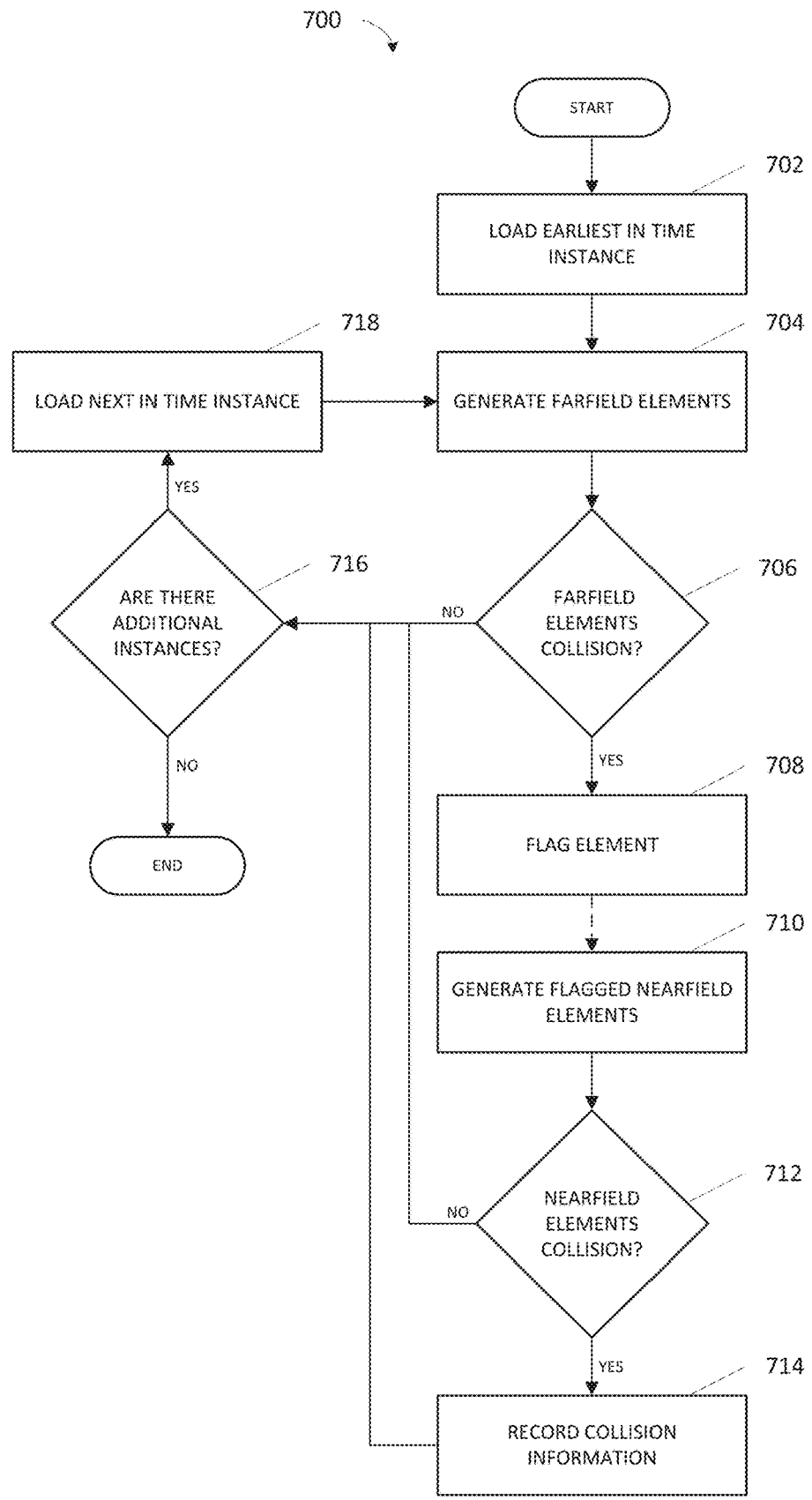
FIG. 7 illustrates an embodiment of a subprocess for generating collision data.

FIG. 7 illustrates an embodiment of a subprocess for generating collision data referenced in block 606 of FIG. 6. The process 700 can be computer-implemented. The process 700 can be implemented by any system that can process data for a game application. For example, the process 700, in whole or in part, can be implemented by a game application 110, a game engine 112, a world prediction module 140, an interactive computing system 130, an application host system 132, and/or another system. Although any number of systems, in whole or in part, can implement the process 700, to simplify discussion, the process 700 will be described with respect to particular systems. Further, although embodiments of the process 700 may be performed with respect to variations of systems comprising various game application environments, to simplify discussion, the process 700 will be described with respect to the user computing system 102. Further, while specific examples of the number of instances and/or number of frames between instances may be used in describing process 700, any number of instances and/or number of frames between instances may be used in process 700.

At block 702, a first predictive instance of a plurality of predictive instance is loaded. The first predictive instance refers to the placement of an instance relevant to the other instances in time. For example, an instance simulating the virtual objects 8 frames away from an initial frame is considered earlier in time that an instance simulating the virtual objects 16 frames away from the initial frame. The predictive instances may be generated concurrently in real time in the user computing system 102. For example, through multithread processing. The predictive instance can be generated as discussed in block 604 of FIG. 6.

At block 704, farfield elements are generated for the virtual objects within the corresponding predictive instance. A farfield bounding box may comprise a set of boundaries for each axis of the virtual environment (e.g., for a three-dimensional environment a bounding box may have two boundary coordinates on the x-axis, two boundary coordinates on the y-axis, and two boundary coordinates on the z-axis). The size of a bounding box may be determined by the range of motion of the associated virtual object over the timeframe between predictive instances. Each farfield elements is associated with virtual object within the virtual environment.

At decision block 706, each farfield element is parsed to determine if a farfield element collides with another farfield element. In some embodiments, farfield elements collide when two farfield bounding boxes overlap as described in FIG. 3A. If it is determined that at least two farfield elements collide, the process 700 proceeds to block 708. Alternatively, if none of the farfield elements collide, process 700 proceeds to block 716. In some embodiments, for each farfield element that is determined to have no collisions with another farfield element the associated virtual object is removed from the instance.

At block 708, each farfield element that is determined to have a collision with another element in block 706 is flagged. For example, data may be stored that indicates a potential collision occurs between two virtual objects of the loaded instance. The virtual objects can be flagged for further procession using nearfield elements.

At block 710, nearfield elements are generated for the virtual objects associated with the flagged farfield elements for the loaded instance. The nearfield elements can be nearfield bounding boxes that are generated as described with respect to FIG. 3C. Each virtual object associated with a flagged farfield element may have one or more nearfield elements generated based on the pose information associated with the virtual object.

At decision block 712, each nearfield element associated with a virtual object is parsed to determine if the nearfield element collides with a nearfield element associated with the corresponding virtual object flagged for the farfield collision. In some embodiments, nearfield elements collide when two nearfield bounding boxes associated with different virtual objects overlap as described in FIG. 3C. If it is determined that at least two nearfield elements of different virtual objects collide, process 700 proceeds to block 714. Alternatively, if none of the nearfield elements of different virtual objects collide, process 700 proceeds to block 716.

At block 714, collision information is generated regarding each nearfield collision determined in block 712. The collision information may include a location on each associated virtual object the collision occurred. For example, the collision information may include that a collision occurred between the foot of one virtual object and the leg of another virtual object. The collision information may include a calculated and/or estimated magnitude of the collision. For example, based on stored information associated with the virtual objects of the nearfield collisions, for example vectors of movement, a magnitude of the collision between the virtual objects may be calculated or estimated. The information may be stored in a set of collision data. The process then proceeds to block 716.

At decision block 716, the system determines if any instances remain to parse for collisions. For example, if the instance loaded in block 702 or block 718 of the current loop is the second instance of eight created instances, then at least one instance remains to parse for collisions. Alternatively, if the instance loaded in block 702 or block 718 of the current loop is the last instance (e.g., the eighth instance of eight created instances), then no instances remain to parse for collisions. If it is determined that at least one instance remains to parse for collisions, process 700 proceeds to block 718. Alternatively, if it is determined that no instance remain to parse for collisions, process 700 is completed.

At block 718, the next instance is loaded. In some embodiments, the next instance in time is loaded. For example, if the previous parsed instance was 8 frames away from the initial frame and the number of frames between instances is 4, the instance occurring at 12 frames away from the initial frame may be loaded.

Overview of Computing Device

Figure 8:
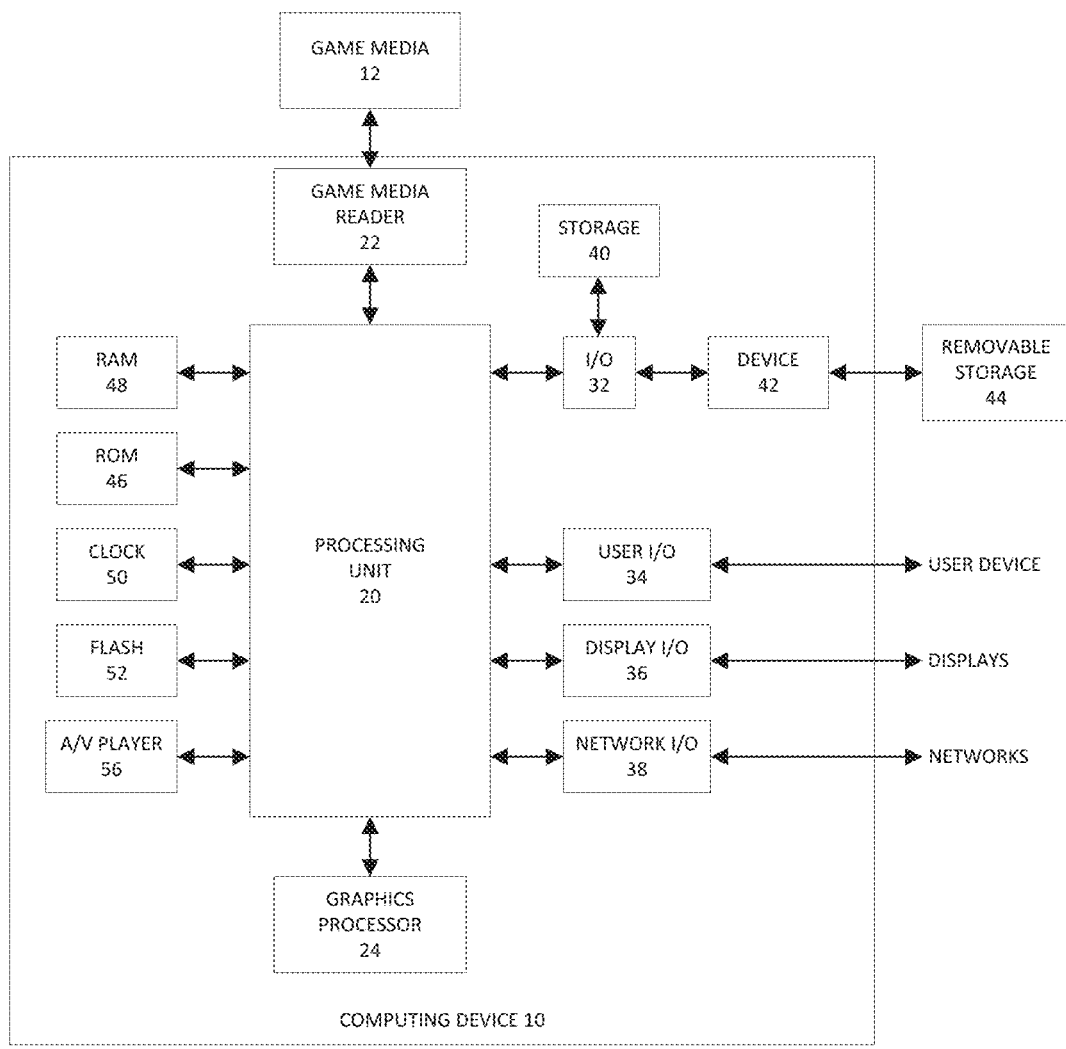
FIG. 8 illustrates an embodiment of computing device.

FIG. 8 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A game media reader 22 is included that communicates with game media 12. The game media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for world prediction within a game application, the method comprising:
by a hardware processor configured with computer executable instructions,
executing a game application comprising a game environment, the game environment comprising a plurality of virtual objects, wherein each of the plurality of virtual objects is associated with positional data;
generating a plurality of instances, wherein each instance comprises a future projection of a first set of the plurality of virtual objects by a set number of frames;
determining a position of a bounding box associated with each of the plurality of virtual objects in the first set in each of the plurality of instances based at least in part on the positional data corresponding to individual virtual objects of the first set;
predicting a collision between two or more virtual objects of the plurality of virtual objects in the first set, wherein predicting the collision comprises:
determining if overlap occurs between individual bounding boxes of the two or more virtual objects,
in response to a determination that the individual bounding boxes of the two or more virtual objects overlap,
generating at least one nearfield bounding box for each of the two or more virtual objects, and
determining if overlap occurs between the at least one nearfield bounding boxes of the two or more virtual objects;
in response to a determination that individual nearfield bounding boxes of the two or more virtual objects overlap, generating collision data based on a predicted collision; and
generating an action for at least one virtual object of the plurality of virtual objects based on the collision data.

2. The computer-implemented method of claim 1, wherein predicting the collision further comprises:
determining no overlap occurs between the individual bounding boxes of a first virtual object of the plurality of virtual objects in the first set and any other of the plurality of virtual objects in the first set, and
deleting the first virtual object from the first set.

3. The computer-implemented method of claim 1, wherein a size of the bounding box is a fixed value, wherein the fixed value is determined based on a range of motion of an associated virtual object, and wherein a centroid of the bounding box is aligned with a centroid of the associated virtual object.

4. The computer-implemented method of claim 1, wherein a size of the at least one nearfield bounding box is a fixed value, wherein the fixed value is determined based on a range of motion of a subcomponent of an associated virtual object, and wherein a centroid of the at least one nearfield bounding box is aligned with a centroid of the subcomponent of the associated virtual object.

5. The computer-implemented method of claim 1, wherein the collision data comprises information on a magnitude of force of the predicted collision and a location of the predicted collision on the two or more virtual objects.

6. The computer-implemented method of claim 5, further comprising filtering the collision data to remove collision data with the magnitude of force below a threshold value.

7. The computer-implemented method of claim 5, further comprising filtering the collision data to remove collision data with the location matching a designated location.

8. A server computing system for world prediction within a game application comprising:
at least one hardware processor configured with computer executable instructions that configure the at least one hardware processor to:
execute a game application comprising a game environment, the game environment comprising a plurality of virtual objects, wherein each of the plurality of virtual objects is associated with positional data;
generate a plurality of instances, wherein each instance comprises a future projection of a first set of the plurality of virtual objects by a set number of frames;
determine a position of a bounding box associated with each of the plurality of virtual objects in the first set in each of the plurality of instances based at least in part on the positional data corresponding to individual virtual objects of the first set;
predict a collision between two or more virtual objects of the plurality of virtual objects in the first set by:
determining if overlap occurs between individual bounding boxes of the two or more virtual objects,
in response to a determination that the individual bounding boxes of the two or more virtual objects overlap,
generating at least one nearfield bounding box for each of the two or more virtual objects, and
determining if overlap occurs between the at least one nearfield bounding boxes of the two or more virtual objects;
in response to a determination that individual nearfield bounding boxes of the two or more virtual objects overlap, generating collision data based on a predicted collision; and
generate an action for at least one virtual object of the plurality of virtual objects based on the collision data.

9. The server computing system of claim 8, wherein the at least one hardware processor is further configured to predict the collision between two or more virtual objects by:
determining no overlap occurs between the individual bounding boxes of a first virtual object of the plurality of virtual objects in the first set and any other of the plurality of virtual objects in the first set, and
deleting the first virtual object from the first set.

10. The server computing system of claim 8, wherein a size of the bounding box is a fixed value, wherein the fixed value is determined based on a range of motion of an associated virtual object, and wherein a centroid of the bounding box is aligned with a centroid of the associated virtual object.

11. The server computing system of claim 8, wherein a size of the at least one nearfield bounding box is a fixed value, wherein the fixed value is determined based on a range of motion of a subcomponent of an associated virtual object, and wherein a centroid of the at least one nearfield bounding box is aligned with a centroid of the subcomponent of the associated virtual object.

12. The server computing system of claim 8, wherein the collision data comprises information on a magnitude of force of the predicted collision and a location of the predicted collision on the two or more virtual objects.

13. The server computing system of claim 12, wherein the at least one hardware processor is further configured to filter the collision data to remove collision data with the magnitude of force below a threshold value.

14. The server computing system of claim 12, wherein the at least one hardware processor is further configured to filter the collision data to remove collision data with the location matching a designated location.

15. A non-transitory computer readable medium comprising computer-executable instructions for world prediction within a game application comprising that, when executed by at least one processor of a computing system, causes the computing system to:
execute a game application comprising a game environment, the game environment comprising a plurality of virtual objects, wherein each of the plurality of virtual objects is associated with positional data;
generate a plurality of instances, wherein each instance comprises a future projection of a first set of the plurality of virtual objects by a set number of frames;
determine a position of a bounding box associated with each of the plurality of virtual objects in the first set in each of the plurality of instances based at least in part on the positional data corresponding to individual virtual objects of the first set;
predict a collision between two or more virtual objects of the plurality of virtual objects in the first set by:
determining if overlap occurs between individual bounding boxes of the two or more virtual objects,
in response to a determination that the individual bounding boxes of the two or more virtual objects overlap,
generating at least one nearfield bounding box for each of the two or more virtual objects, and
determining if overlap occurs between the at least one nearfield bounding boxes of the two or more virtual objects;
in response to a determination that individual nearfield bounding boxes of the two or more virtual objects overlap, generating collision data based on a predicted collision; and
generate an action for at least one virtual object of the plurality of virtual objects based on the collision data.

16. The non-transitory computer readable medium of claim 15, wherein the computing system is further configured to predict the collision between two or more virtual objects by:
determining no overlap occurs between the individual bounding boxes of a first virtual object of the plurality of virtual objects in the first set and any other of the plurality of virtual objects in the first set, and
deleting the first virtual object from the first set.

17. The non-transitory computer readable medium of claim 15, wherein a size of the bounding box is a fixed value, wherein the fixed value is determined based on a range of motion of an associated virtual object, and wherein a centroid of the bounding box is aligned with a centroid of the associated virtual object.

18. The non-transitory computer readable medium of claim 15, wherein a size of the at least one nearfield bounding box is a fixed value, wherein the fixed value is determined based on a range of motion of a subcomponent of an associated virtual object, and wherein a centroid of the at least one nearfield bounding box is aligned with a centroid of the subcomponent of the associated virtual object.

19. The non-transitory computer readable medium of claim 15, wherein the collision data comprises information on a magnitude of force of the predicted collision and a location of the predicted collision on the two or more virtual objects.

20. The non-transitory computer readable medium of claim 19, wherein the computing system is further configured to filter the collision data to remove collision data with the location matching a designated location.

* * * * *